Figures 1, 2:
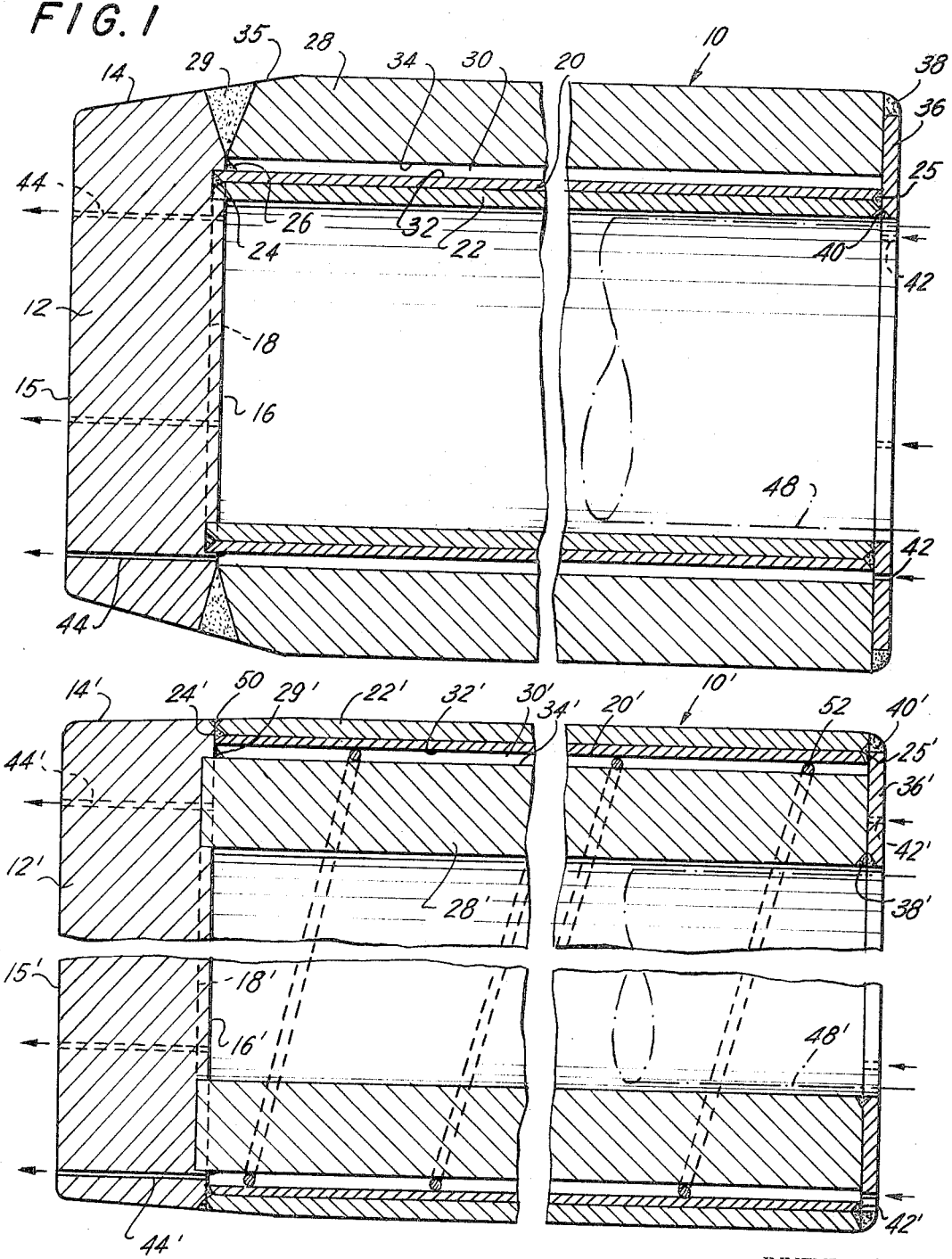

May 2, 1967 — F. GOEDECKE ETAL — 3,316,630

CLAD BODY MANUFACTURE

Filed Oct. 4, 1962

INVENTORS
Fritz Goedecke
Paul Opel
Günther Ivens

BY Michael J. Striker

United States Patent Office 3,316,630
Patented May 2, 1967

3,316,630
CLAD BODY MANUFACTURE
Fritz Goedecke, Dusseldorf-Benrath, Paul Opel, Langenfeld-Richrath, and Gunther Ivens, Dusseldorf-Wersten, Germany, assignors to Stahl- und Rohrenwerk Reisholz G.m.b.H., Dusseldorf-Reisholz, Germany
Filed Oct. 4, 1962, Ser. No. 228,313
Claims priority, application Germany, Oct. 5, 1961, St 18,406
6 Claims. (Cl. 29—473.5)

This invention relates to the manufacture of a clad or plated body, and more particularly to a method of and a blank or workpiece for producing a clad or plated body from a base member and a protective metallic member.

The invention is applicable especially to the production of seamless bimetallic hollow bodies, e.g., tubes, comprising a base member of ferritic material such as ferritic steel which, by the application of heat and pressure, is clad at its inside or outside with a member of corrosion resistant material such as a corrosion resistant ferritic or austenitic steel.

Conventional methods of cladding ferritic steel tubes by the application of heat and pressure have not been satisfactory since due to the presence or formation of oxides and other impurities at the interface only an imperfect bonding effect has been obtained. In view of the weakness of the joint, the known methods are applicable to members of a limited diameter and length only. Particular difficulties are encountered in the case of austenitic steels. It is not normally possible to mount an austenitic steel member in a ferritic steel member by shrinking or the like because due to the different coefficients of expansion and contraction of austenitic and ferritic steels, no firm connection is obtained when the members cool down.

Solid reducing agents are not suitable for the cladding of members by the application of heat and pressure since some solid particles tend to remain at the interface, which would impair the bonding process.

It is an object of the invention to provide an improved method of producing a clad body, in which the presence of oxides and other impurities at the interface is avoided or minimized in an effective manner.

It is also an object of the invention to provide a method of producing a clad body, which results in an improved bonding effect and at the same time is economical.

It is another object of the invention to provide an improved method which renders it possible to clad a ferritic steel member of a relatively large cross-section and relatively great length with an austenitic steel member.

It is a further object of the invention to provide an improved method of producing a clad body, in which the cladding member is reinforced during the manufacture of the body.

It is an additional object of the invention to provide an improved blank or workpiece or assembly for the manufacture of a clad body.

With these and other objects in view, the invention includes the provision of a method of producing a clad body from a base member and a protective metallic member, in which both members are arranged adjacent each other so that the faces thereof to be joined confront each other in spaced relationship to form a gap therebetween. A gaseous cleaning agent is then passed through the gap along the spaced faces, and the members are joined to each other at the aforementioned faces by pressing the members upon each other.

Another aspect of the invention resides in a process for manufacturing an article composed of a pair of members of oxidizable material in face-to-face contact with each other, in which both members are positioned so that the faces thereof to be placed in engagement with each other are spaced slightly from each other to define a gap therebetween, whereupon a gas preventing oxidation of the aforementioned faces is located in the gap. The faces are then brought into contact with each other while the gas is maintained in the gap during the reduction in volume of the gap and until disappearance thereof so that no other gas capable of oxidizing the members to be joined can be trapped between the faces to be bonded together.

A further aspect of the invention resides in a blank for producing a clad body. The blank comprises a base member and a protective metallic member, and these members are supported adjacent each other so that the faces to be joined confront each other in spaced relationship to form a gap therebetween adapted to have a cleaning gas passed therethrough.

A preferred method according to the invention serves for the production of a seamless bimetallic tubular body from a blank comprising a base tube and a cladding tube by heating the blank and then drawing or pressing it over a mandrel on a draw bench or a push bench. In this preferred method, a tube consisting of corrosion resistant ferritic or austenitic steel or of another corrosion resistant metal is inserted in or telescoped over a base tube of ferritic material in spaced relationship to form a gap therebetween. Accordingly, in case of an inner cladding the internal diameter of the base tube should be larger than the external diameter of the cladding tube, and vice versa. The difference between the diameters should be sufficient for the ready passage of gas through the annular gap formed between the tubes. Before the tubes are assembled in the manner set forth, the usually thin-walled corrosion resistant tube may temporarily be provided with a reinforcement in the form of an armor tube which is of equal length but consists of an unalloyed or carbon steel. The reinforcing or armor tube may be welded to the corrosion resistant tube at both ends thereof. The circumferential faces at which the reinforcing and cladding tubes contact each other are preferably oxidized to facilitate the removal of the reinforcing tube after the cladding operation has been completed. A closure means or head is provided, which has an annular groove therein. In the case of an inner cladding, first one end of the corrosion resistant tube with the reinforcing tube thereon is positioned in the annular groove of the head and secured thereto by welding; thereafter, the base tube is telescoped over the corrosion resistant tube in spaced relationship thereto and secured to the head by welding. In the case of an outer cladding, the procedure is reversed in that first the base tube is welded to the head and then the corrosion resistant and armor tubes are located in their proper position and secured in place by welding.

The head may advantageously serve for engagement with the mandrel of a draw or push bench during the cladding or plating operation.

At the other end of the blank, the gap between the base tube and the corrosion resistant tube is shielded by means of an annular cover which consists of a material easily deformable when heated. The cover is secured to the blank, for example, by welding. Openings are provided in the annular cover and in the head and are aligned with the gap.

A gaseous reducing agent, e.g., hydrogen, is passed through the gap with the aid of the perforations in the cover and head. The blank is then heated to a predetermined temperature suitable for subsequent hot working and is maintained at this temperature until the flow of gaseous reducing agent has caused the removal of all impurities which would impair the bonding and cladding operation. To avoid sagging or bending of the cladding tube and consequent contact thereof with the base tube during heating, the unalloyed armor tube reinforcing the base tube should have a wall thickness sufficient to prevent such deformation. If desired, a spacer means may be arranged between the base and cladding tubes, e.g., a wire of a diameter corresponding to the width of the gap between the tubes may be helically wound around the cladding tube in the case of an inner plating or around the base tube in the case of an outer plating. The provision of such a spacer means will ensure that the gap has a substantially uniform width throughout and the gaseous reducing agent will flow therethrough in a substantially uniform manner. It should be noted that in the case of an inner plating, the armor tube will not only serve to reinforce the cladding tube, but will also protect the latter from cooling down too rapidly when a drawing mandrel is inserted therein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an elevational cross-sectional view of a blank or workpiece according to the invention; and FIG. 2 is a view similar to FIG. 1, but illustrates another embodiment.

Referring to the drawings, FIG. 1 illustrates a blank or workpiece or assembly generally indicated at 10 which is adapted for producing an internally clad, seamless tubular body in accordance with the invention. A closure member or head 12 is provided at the front end of blank 10. The head 12 is of frusto-conical shape as indicated at 14, the front face 15 being smaller than the rear face 16. An annular groove 18 is arranged in the rear face 16 to receive the ends of a cladding tube 20 and an armor tube 22, the latter serving as a temporary reinforcement. The cladding and armor tubes are welded together at both ends thereof as indicated at 24, 25; and one end of the cladding tube is welded to head 12 as shown at 26. Preferably, the cladding tube 20 consists of a corrosion resistant austenitic steel while the armor tube 22 consists of an unalloyed or carbon steel. The inner circumferential face of tube 20 and the outer circumferential face of the temporary armor tube 22, which contact each other, may be oxidized to facilitate their subsequent separation at the time when the cladding operation has been completed. A base tube 28 of preferably ferritic steel is telescoped over the reinforced cladding tube 20 in spaced relationship thereto and welded to head 12 at 29 in a position such that a gap 30 remains between the austenitic and base tubes 20, 28 with the faces thereof indicated at 32, 34 confronting each other. The base tube 28 may be provided with a tapered end 35 to conform to the conical shape of the closure member 12. At the rear end of the blank, the gap 30 is shielded by means of an annular cover 36 which may be welded to the base tube 28 and armor tube 22 at 38 and 40, respectively. The annular cover 36 has openings 42 through which a gaseous reducing agent is forced into the gap 30 to remove air therefrom and reduce and clean the material of tubes 20, 28 at the faces 32, 34. Suitable conduit means (not shown) may serve to connect the openings 42 to a source of reducing gas. Openings 44 in head 12 serve for exit of the reducing gas, the direction of flow being indicated by arrows in the drawing.

As stated hereinbefore, the blank is heated to the temperature desired for the subsequent hot working thereof and this temperature is maintained until the flow of the gaseous reducing agent has caused the removal of all impurities which would interfere with the operation. The heated blank 10 is then pushed through a conventional drawing die (not shown) by means of a mandrel indicated in phantom at 48 to press the base tube 28 upon the cladding tube 20, whereby these tubes are bonded or welded together. The reducing gas may remain in the gap during the reduction in volume of the gap and until disappearance thereof so that no gas capable of oxidizing the faces 32, 34 will be trapped therebetween. After a heat treatment which follows immediately upon the forming operation, both ends of the blank 10 are cut off and the temporary armor tube 22 is removed by suitable means.

FIG. 2 illustrates a blank 10' adapted for the production of a tubular body having a cladding at its outside, and also shows spacing means. Similar parts are indicated by like numerals in FIGS. 1 and 2, but each of the numerals repeated in FIG. 2 is provided there with a prime. When assembling the blank of FIG. 2, first one end of the base tube 28' is located in the groove 18' and welded to head 12' at 29'. Then the tubes 20' and 22' are placed in their proper position, and the armor tube 22' is welded to head 12' at 50. Various details of FIG. 2 will be understood from the description of FIG. 1. During the hot working step, the wall of the armor tube 22' will be pressed inwardly and will in turn bring tube 20' into engagement with the base tube 28' to join or weld the latter tubes firmly together.

As further shown in FIG. 2, a spacer means in the form of a wire 52 may be helically wound around the innermost or base tube 28' to keep the tubes 20' and 28' apart. It will be clear that a similar wire may be wound around tube 20 in the embodiment of FIG. 1. Instead of winding the wire around one of the tubes, the wire may first be wound in coil form and the coil may then be inserted in gap 30 or 30'.

The wire 52 consists either of high-alloy austenitic steel or unalloyed ferritic steel and remains between the tubes 20' and 28' to be deformed with them during the hot working step.

The method and blank according to the invention are of particular advantage in the manufacture of composite tubes comprising a thin austenitic layer bonded to a ferritic base member which latter imparts a sufficient strength to the composite body. In the past, such bimetallic tubes could not be produced in a satisfactory manner. There is a great demand for composite tubes of this type for the chemical industry and for atomic energy plants. Heretofore, tubes consisting of austenitic steel throughout have been used for such purposes and the practice of the invention will not only facilitate the manufacture of suitable tubular bodies but will also lead to very significant savings.

It will be understood that each of the elements described above, or two or more together, may also find a useful application in other types of manufacture differing from the types described above.

While the invention has been illustrated and described as embodied in a method of and a blank for producing clad seamless hollow bodies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a clad seamless hollow body from a ferritic tube and a thin walled corrosion resistant metallic tube, comprising the steps of mounting a temporary reinforcing means on one of the circumferential faces of said corrosion resistant tube while leaving the other circumferential face thereof free; placing one of said tubes within the other tube in spaced relationship to each other and securing said tubes and said reinforcing means to each other so that said thin walled corrosion resistant tube is supported by said reinforcing means in a position in which the free circumferential face of said corrosion resistant tube is adjacent to and spaced from one of the circumferential faces of said ferritic tube and an annular gap is formed therebetween; passing a gaseous reducing agent through said annular gap to reduce and clean the material of said tubes at their adjacent faces; heating said tubes to a predetermined temperature in the presence of said gaseous agent; drawing said tubes at said predetermined temperature to firmly unit said tubes at their reduced and cleaned faces; and then removing said temporary reinforcing means from the clad body produced.

2. A method of producing a clad seamless hollow body from a ferritic tube and a corrosion resistant thin wall metallic tube, comprising the steps of mounting a temporary tubular reinforcing member on one of the circumferential faces of said corrosion resistant tube while leaving the other circumferential face thereof free; placing one of said tubes within the other tube in spaced relationship to each other and securing the ends of said tubes and of said reinforcing tubular member to each other so that said corrosion resistant thin wall tube is supported along the length thereof by said reinforcing tubular member in a position in which the free circumferential face of said corrosion resistant tube is adjacent to one of the circumferential faces of said ferritic tube, but spaced therefrom to form an annular gap between said faces; passing a gaseous reducing agent through said annular gap to reduce and clean the material of said tubes at their adjacent faces; heating said tubes and said tubular reinforcing member to a predetermined temperature in the presence of said gaseous agent; drawing the tubes and said tubular reinforcing member at said predetermined temperature to firmly unit said ferritic tube and said corrosion resistant tube at their reduced and cleaned faces; and removing said tubular reinforcing member from the clad body produced.

3. A method according to claim 2 including the step of placing spacer means in said gap in contact with said adjacent faces and in such a manner to leave a free passage between said faces.

4. A method according to claim 2 wherein the step of mounting said tubular reinforcing member includes mounting said tubular reinforcing member on the outer circumferential face of said corrosion resistant tube; wherein the step of placing one of said tubes includes placing said corrosion resistant thin wall tube about said ferritic tube to form said gap; and including the step of placing spacer means in the form of a coiled wire in said gap in contact with the inner circumferential face of said corrosion resistant thin wall tube and with the outer circumferential face of said ferritic tube in such a manner as to leave a free passage between said adjacent circumferential faces.

5. A method of producing a clad seamless hollow body from a ferritic tube and a corrosion resistant thin wall metallic tube, comprising the steps of oxidizing one circumferential face of a tubular unalloyed steel reinforcing member; mounting one circumferential face of said corrosion resistant tube on said oxidized face of said tubular reinforcing member while leaving the other circumferential face of said corrosion resistant tube free; placing one of said tubes within the other tube in spaced relationship to each other and securing the ends of said tubes and of said reinforcing tubular member to each other so that said corrosion resistant thin wall tube is supported along the length thereof by said reinforcing tubular member in a position in which the free circumferential face of said corrosion resistant tube is adjacent to one of the circumferential faces of said ferritic tube, but spaced therefrom to form an annular gap between said faces; passing a gaseous reducing agent through said annular gap to reduce and clean the material of said tubes at their adjacent faces; heating said tubes and said tubular reinforcing member to a predetermined temperature in the presence of said gaseous agent; drawing the tubes and said tubular reinforcing member at said predetermined temperature to firmly unit said ferritic tube and said corrosion resistant tube at their reduced and cleaned faces; and removing said tubular reinforcing member from the clad body produced, whereby said oxidized face of said tubular reinforcing member will facilitate removing of the latter from the clad body.

6. A method of producing a clad seamless hollow body from a ferritic tube and a corrosion resistant thin wall metallic tube, comprising the steps of mounting a temporary tubular reinforcing member on the inner circumferential face of said corrosion resistant tube while leaving the outer circumferential face thereof free; placing said corrosion resistant tube with said tubular reinforcing member within the other tube in spaced relationship to each other and securing the ends of said tubes and of said reinforcing tubular member to each other so that said corrosion resistant thin wall tube is supported along the length thereof by said reinforcing tubular member in a position in which the free circumferential face of said corrosion resistant tube is adjacent to the inner of the circumferential face of said ferritic tube, but spaced therefrom to form an annular gap between said faces; passing a gaseous reducing agent through said annular gap to reduce and clean the material of said tubes at their adjacent faces; heating said tubes and said tubular reinforcing member to a predetermined temperature in the presence of said gaseous agent; placing a mandrel into said tubular reinforcing member; drawing said tubes and said tubular member at said predetermined temperature with said mandrel in said tubular reinforcing member through a drawing die to firmly unite said ferritic tube and said corrosion resistant tube with each other at their reduced and cleaned faces, whereby said tubular reinforcing member between said mandrel and said corrosion resistant tube will prevent premature cooling of the latter; and removing said tubular reinforcing member from the clad body produced.

References Cited by the Examiner

UNITED STATES PATENTS

| | | | |
|---|---|---|---|
| 674,394 | 5/1901 | Beck | 29—474.3 |
| 2,423,811 | 7/1947 | Goulding | 29—471.5 |
| 2,445,858 | 7/1948 | Mitchell et al. | 29—194 |
| 2,468,206 | 4/1949 | Keene et al. | 29—471.5 |
| 2,713,196 | 7/1955 | Brown | 29—497.5 |
| 2,745,172 | 5/1956 | Townsend | 29—194 |
| 2,813,332 | 11/1957 | Keay | 29—497.5 |
| 2,820,286 | 1/1958 | Andrus | 29—497.5 |
| 2,946,119 | 7/1960 | Jones et al. | 29—470 |
| 2,947,078 | 8/1960 | Pflumm et al. | 29—498 |
| 2,982,017 | 5/1961 | Drummond | 29—470 |
| 3,140,539 | 7/1964 | Holtzman | 29—497.5 |
| 3,156,042 | 11/1964 | Reed | 29—497.5 |

JOHN F. CAMPBELL, *Primary Examiner.*

HYLAND BIZOT, *Examiner.*

R. O. DEAN, L. J. WESTFALL, *Assistant Examiners.*